Jan. 14, 1947.  C. J. BURGY  2,414,357
ANTIPLUGGING DEVICE
Filed Feb. 8, 1945  3 Sheets-Sheet 1
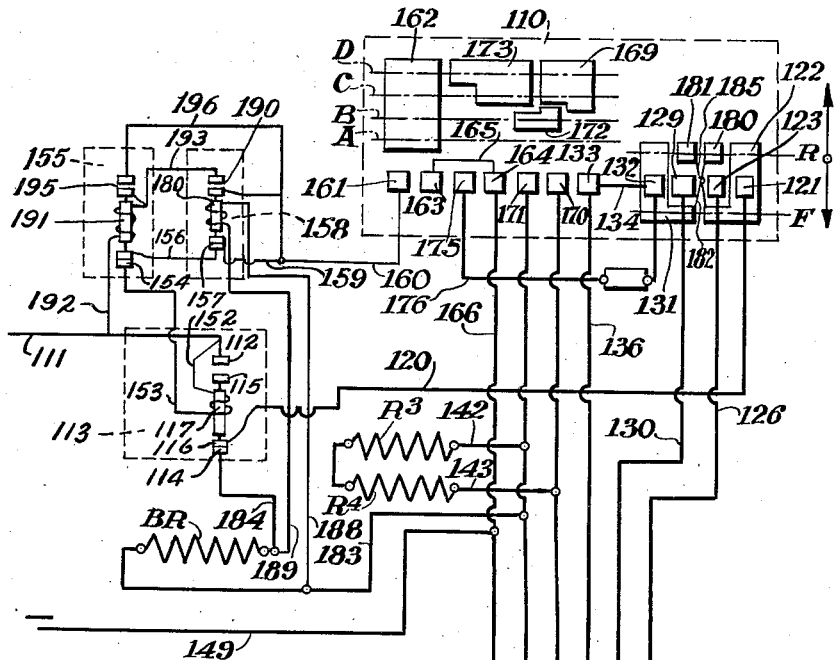
*Fig. 7*
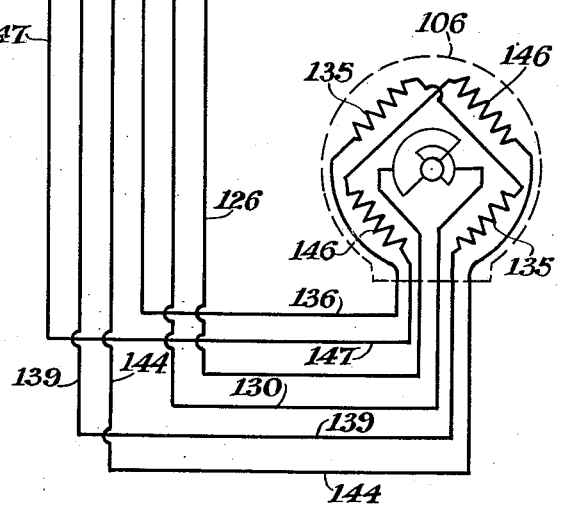
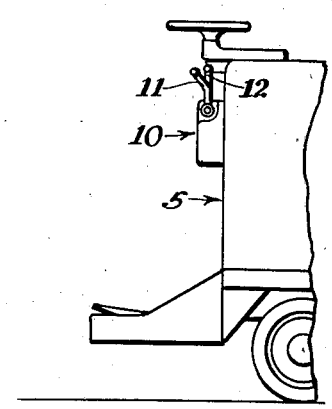
*Fig. 1*
INVENTOR.
CHARLES J. BURGY.
BY *Fay, Golrick & Chilton.*
*Attorneys.*

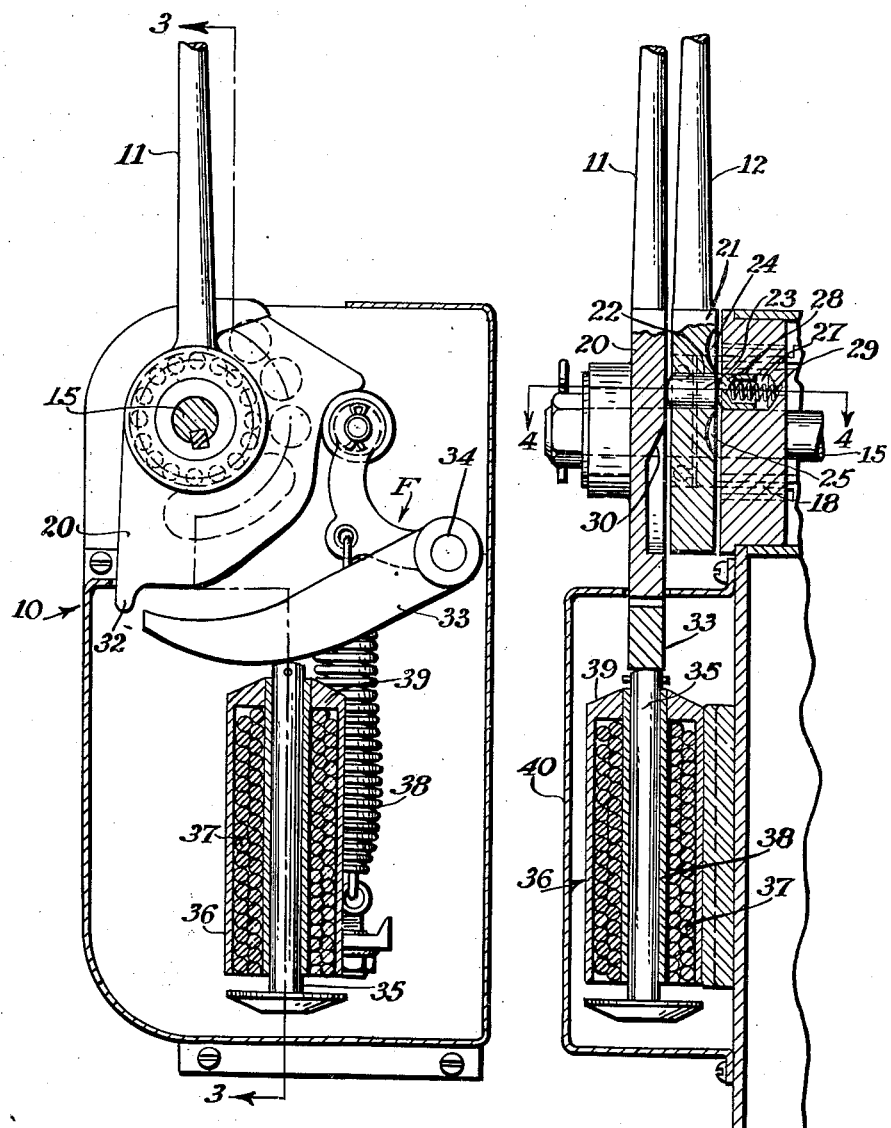

INVENTOR.
CHARLES J. BURGY.
BY Fay, Golrick & Chilton.
Attorneys.

Patented Jan. 14, 1947

2,414,357

UNITED STATES PATENT OFFICE 2,414,357

ANTIPLUGGING DEVICE

Charles J. Burgy, Cleveland, Ohio, assignor to The Elwell-Parker Electric Company, Cleveland, Ohio, a corporation of Ohio Application February 8, 1945, Serial No. 576,829

8 Claims. (Cl. 172—179)

The present invention relates to control systems for electrically driven industrial trucks and the like.

Industrial trucks are often driven by an electric motor supplied with current from batteries carried on the truck. The control for the drive motor is generally provided with a speed regulating lever which may be moved from a neutral, or inoperative, position through a plurality of speed controlling positions. Also associated with the drive motor control is a reverse lever movable to one position to cause forward motion of the truck and to another position for reversing the motion of the truck. This lever generally has an intermediate or neutral position.

It is a practice to brake the motion of the truck by throwing the speed control lever to the neutral position and then reversing the armature connections by moving the reversing lever to its opposite operative position, thereby causing the motor to act as a generator that is driven by the wheels of the truck. A closed circuit is formed at this time, including a suitable resistance for consuming the generated current. This type of brake is referred to as a "dynamic" brake. In many instances truck operators resort to the practice of throwing the speed control lever to a speed control position to obtain a greater braking effect when using the dynamic brake. This application of current, prior to the stopping of the truck, places a serious and severe strain on the driving mechanism and the motor and, also, an excessively high current passes through the motor.

An object of the present invention, therefore, is to provide a control system for an electric drive motor in an industrial truck or the like in which it is impossible for the operator to connect the motor with the source of current while the dynamic brake is in effect and the truck's momentum has not been substantially checked.

In carrying out my invention, it is an object to provide a switch for controlling the flow of current to the drive motor, which switch is operated by an electro-responsive device, such as a solenoid, the circuit of which is controlled by a device responsive to current generated by the motor, when the motor is acting as a generator for braking the truck, so that current cannot be supplied to the motor while the latter is acting as a generator.

A still further object of the invention is to provide a control system for an electric drive motor in which the supply of current to the motor is interrupted when the motor is acting as a generator and the circuit is continued to be interrupted after the motor armature is stopped in the event that the speed regulator has been moved to any of its speed control positions. Thus, before reversal of the truck can take place the speed controller must be moved to its neutral position and the motion of the truck substantially completely stopped.

In carrying out the invention, it is also contemplated that an interlock be provided between the speed control lever and the reverse lever, whereby the reverse lever cannot be moved to its opposite direction controlling position until the speed control lever is moved to its neutral position, and that an electro-responsive latch be provided for latching the speed control lever in its neutral position during the time the dynamic brake is in effect so that movement of the speed control lever to speed control positions cannot be effected until the momentum of the truck has been substantially checked.

Other objects and advantages of the invention will be apparent from the following description of preferred forms of embodiment of the invention, reference to be had to the accompanying drawings wherein:

Fig. 1 is a fragmentary view in elevation of an industrial truck embodying my invention;

Fig. 2 is a side view, partly in section, of a part of the motor control mechanism of the truck;

Fig. 3 is a view taken substantially on line 3—3 of Fig. 2;

Fig. 7 is a diagrammatic representation of the control system for an industrial truck embodying another form of the invention.

Figure 6:
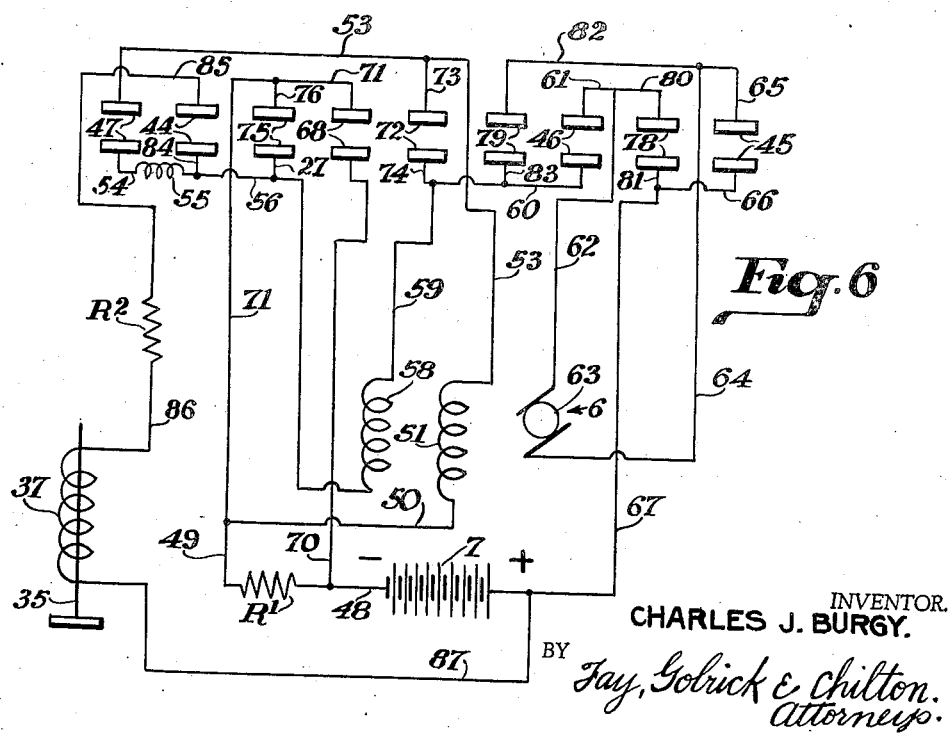
Fig. 6 is a diagrammatic representation of the control system for an industrial truck embodying one form of the invention.

Referring to Figs. 1 and 6, I have shown an industrial truck 5 embodying one form of my invention, which truck is driven by a direct current electric motor 6, the current of which is supplied by suitable batteries 7 carried by the truck. A motor control mechanism 10 is provided, which includes a speed regulating lever 11 and a reversing lever 12. In the operation of the truck, the operator moves the lever 12 from a neutral position to either the forward or reverse position, as may be desired, and he then moves the speed lever 11 from its neutral position to any of the several speed control positions.

When it is desired to reduce the speed of the truck, as for stopping or braking the truck in descending a grade, the lever 11 is moved to its neutral position and reverse lever 12 is thrown to its opposite position. This action causes disconnection of the motor from its source of current, reverses the armature circuit of the drive motor so that the motor then becomes a generator and a resistance is thrown into a closed motor circuit for absorbing the current generated by the motor, thus effecting the braking action.

The motor control mechanism 10 may be similar to that described in the patent to Clyde E. Cochran, No. 2,338,097, and in general, the lever 11 is connected to a shaft 15 which shaft carries a plurality of cams which operate switching devices indicated diagrammatically at 44, 47, 68, 72 and 75 in certain sequences for effecting increasing speeds of the motor 6 as the lever is moved from its neutral position, shown in Fig. 2, counter-clockwise. The sequential operation of the switches 16 will be more fully explained hereinafter. The lever 12 is connected with a tubular member 18 on which are mounted cams for operating switches 45, 46, 78 and 79 for reversing the motor circuit, as will be brought out in detail hereinafter. Since the cam and switches operated thereby are shown in the aforementioned patent, they are not shown here.

Figure 4:
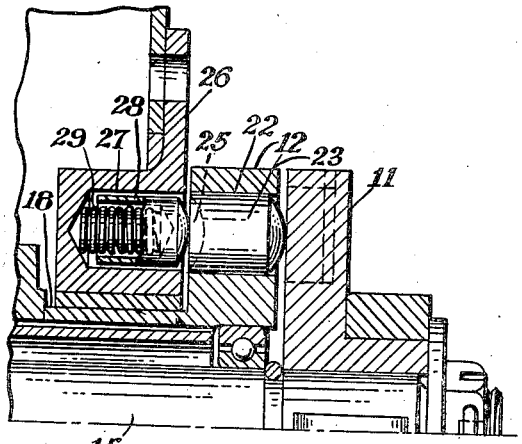
Fig. 4 is a view, in section, taken substantially on line 4—4 of Fig. 3 but on a larger scale.
Figure 5:
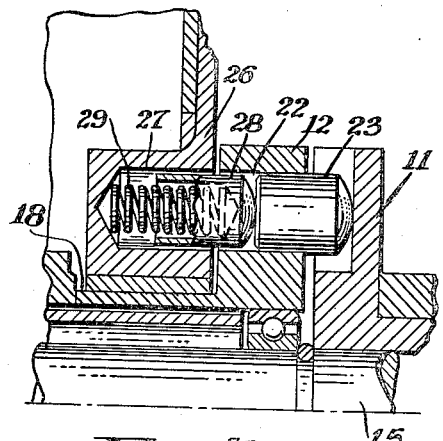
Fig. 5 is a view similar to that of Fig. 4, but showing the speed control lever in another position.

The levers 11 and 12 are moved about a common axis and they have hub portions 20 and 21, respectively, which lie adjacent one another. The lever 11 is manually retained in various speed control positions. A lever returning device F, which functions to return lever 11 to an off or dynamic brake position includes a lever pivoted at 34 and spring pressed against the edge of the hub 20. The contour of the hub 20 is in the form of a cam having lands corresponding to camming actions of the cam surfaces of the cam shaft 15 and the contour is such as to facilitate the return of the lever 11 to dynamic brake position against any counter influence of the other cam surfaces. The hub 21 of the lever 12 is bored at 22 and a cylindrical member 23 slides in the bore. The end of the member 23 adjacent hub 20 is rounded and its opposite end is flat. The member 23 is substantially the same length as bore 22. Rounded depressions 24 and 25 are formed in the hub 21 on either side of the bore 22. A block 26 is provided on the casing of the control mechanism 10, which block is bored at 27 and a hollow cylindrical member 28 is slidable in this bore and is urged outwardly by the bore of a coil spring 29. The bore 27 is of the same diameter as bore 22 and they are adapted to lie in alignment when the lever 12 is in its neutral position, as shown in Figs. 3, 4 and 5. The hub 20 is provided with a cam 30 formed by undercutting the surface of the hub adjacent hub 20. The undercut portion is adapted to be moved in alignment with the cylindrical member 23 when the speed control lever 11 is moved to any of its speed control positions and when the lever 11 is moved to its neutral position, the undercut portion is out of alignment with the member 23. It will be seen that the cam 30 will force the member 23 into the bore 22 when the lever 11 is moved to its neutral position. It is evident that when the reverse lever 12 is moved to its neutral position and the speed control lever 11 is in one of its speed control positions, member 28 will enter bore 22, and thereby cause member 23 to project into the undercut portion of the hub 20, as may be seen in Fig. 5. Member 28, extending into both bores 22 and 27, blocks further movement of lever 12 until the lever 11 is moved to its neutral position, whereupon cam 30 forces member 23 into bore 22 and member 28 within bore 27. When the lever 12 is moved to one or the other of its operative positions, member 28, which has its outer end rounded, is urged into one or the other of the depressions 24 or 25 and thereby releasably maintains the lever 12 in position. Thus, an interlock is provided between the speed control and reverse levers which prohibits reversal of the motor unless the speed control lever is first moved to the neutral position.

I have provided means for locking the lever 11 in neutral position during the time the dynamic brake is in effect. The hub 20 is provided with an ear 32, and a latch lever 33, pivoted at 34, is arranged to be moved into the path of movement of the ear 32 by the armature 35 of an electromagnet 36, so that when the magnet is energized the end of lever 33 is engageable with ear 32 for blocking rotation of lever 11 to its speed control positions. When the magnet is deenergized, the armature 35 falls and lever 33 drops, thereby permitting rotation of lever 11.

The magnet 36 comprises a coil 37 wound on a core 38. A suitable housing 39 is provided which is attached to the casing of the control mechanism 10. Preferably a cover 40 is secured over the magnet and latch lever. The coil 37 is adapted to be connected in the motor circuit during dynamic braking and energized by the current generated by the motor, as will be brought out hereinafter.

Referring to Fig. 6, when the truck is at rest, all switches but 44 are open. When the lever 12 is thrown to the forward position and the speed control lever moved to the first speed position, contacts 45 and 46 are closed by movement of lever 12 and contacts 44 are opened, and contacts 47 are closed by movement of lever 11. A circuit is thus established from the negative pole of battery 7 through wire 48 to resistance $R^1$, wires 49 and 50 to field winding 51 of motor 6, wire 53, contacts 47, wire 54, blow out coil 55, wire 56 to field winding 58 of motor 6, wires 59 and 60, contacts 46, wires 61 and 62 to armature 63 of motor 6, wires 64 and 65, contacts 45 and wires 66 and 67 to positive pole of battery 7.

The second speed control position of lever 11 causes the resistance $R^1$ to be shunted out of circuit by closure of contacts 68. This shunt circuit includes wire 70, contacts 68, and wire 71. Wires 70 and 71 are connected to wires 48 and 50, respectively. This, of course, increases the voltage to the motor 6, increasing the motor speed.

A further increase in speed may be had by moving the lever 11 to the third speed control position which causes the field windings 51 and 58 to be connected in parallel. Contacts 72 are closed for establishing a circuit comprising wire 73, contacts 72 and wire 74, wires 73 and 74 being connected to wires 53 and 60, respectively. Contacts 47 are opened and contacts 75 closed, thereby completing the circuit for winding 58 from wire 71 through wire 75, contacts 75 and wire 77 to wire 56.

The motor is reversed by moving lever 12 to its opposite control position in which contacts 45 and 46 are opened and contacts 78 and 79 are closed. This causes a reversal in the direction of current flow through the motor armature 63 by connecting wire 62 with wire 67 through wire 80, contacts 78 and wire 81. Wire 64 is connected to wire 66 through wire 82, contacts 79 and wire 83.

When the truck is rolling in one direction and the motor is being driven by the wheels of the truck through the driving gear, if the lever 12 is moved to the reverse direction position, the motor will act as a generator. As explained hereinbefore, lever 12 may be moved to such reverse position only when the speed control lever 11 is in neutral position. In neutral position contacts 44 are closed and contacts 47, 68, 72 and 75 are open. Therefore, when the motor is acting as a generator with contacts 45 and 46 closed a closed circuit is established from armature 63 through wires 62 and 61, contacts 46, wires 60 and 59, winding 58, wires 56 and 84, contacts 44, wire 85, resistance $R^2$, wire 86, solenoid coil 37, wires 87, 67 and 66, contacts 45, wires 65 and 64 to armature 63.

Resistance $R^2$ is designed to absorb a substantial portion of the power generated by the motor and when in series with the coil 37 the two absorb all such energy. Coil 37 could be designed to comprise all of the resistance. Upon energization of solenoid coil 37, the lever 11 is latched in neutral position in the manner explained hereinbefore. The coil 37 is designed to maintain the armature 36 in the latching position until there is substantially no current passing therethrough. Thus, it is impossible for the operator to throw the battery in circuit while the motor is acting as a generator for braking purposes.

Another form of the invention is illustrated in Fig. 7 in which a motor control system is shown wherein it is impossible for the operator of the truck to throw the battery in the motor circuit during the effective use of the dynamic brake. In this embodiment of the invention the control mechanism 10 may be used but without the solenoid latching device for the lever 11. In this embodiment of the invention I have shown, diagrammatically, a motor control mechanism 110 which includes drum type contacts 162, 169, 172 and 173 which are actuated by a speed control lever, not shown, and reversing contacts 122, 131, 180 and 181 which are also of the drum type, and these reversing contacts are adapted to be actuated by a reversing lever, not shown. The speed lever and reversing lever for the mechanism 110 are mounted similarly to levers 11 and 12 described hereinbefore, and they have a similar interlocking arrangement so that the reverse lever cannot be moved to a reversing position while the speed control lever is in any of the speed controlling positions. Also, the controller cam shaft has to be in the full dynamic braking position before the reverse lever can be shifted to reversing position. For this reason, these levers will be referred to by the same reference numerals as were the corresponding levers of the mechanism 10.

The drum contacts actuated by the speed control lever 11 are adapted to slidingly engage fixed contacts 133, 161, 163, 164, 170, 171 and 175 in certain sequences when the lever is moved through four speed control positions. Referring to Fig. 7, the dotted lines A, B, C and D indicate the positions of the fixed contacts relative to the drum contacts when the lever 12 is in its respective speed control positions, it being understood that the drum contacts are moved in unison in a direction normal to the dotted lines. In Fig. 7 the position of the contacts are shown when the speed control lever is in its neutral position.

The drum contacts operated by lever 12 are adapted to slidingly engage fixed contacts 121, 123, 129 and 132 and the dotted lines F and R indicate the positions of the fixed contacts relative to the drum contacts when the lever 12 is moved to its "forward" and "reverse" positions, it being understood that the drum contacts are moved in unison in a direction normal to the dotted lines. In Fig. 7, the contacts are shown as when the reverse lever 12 is in its neutral position.

The drive motor for the truck is indicated at 106. The circuit for the drive motor includes a power line 111 which is connected to the positive pole of the batteries (not shown) carried by the truck and which line is connected to contact 112 of a magnetic relay 113. The magnetic relay 113 includes two stationary switch contacts 112 and 114 and two movable switch contacts 115 and 116, which are adapted to engage contacts 112 and 114 respectively. The contacts 115 and 116 are carried by the armature of a solenoid 117, and when the solenoid 117 is de-energized contacts 114 and 116 are closed and contacts 112 and 115 are opened. When the solenoid is energized, contacts 112 and 115 close and contacts 114 and 116 open. A wire 120 connects contact 115 with contact 121. The contact 121 is engageable by the contact 122, which contact is adapted to electrically connect contact 121 with contact 123 when the lever 12 is moved to the "forward" position, for example. Contact 123 is connected with one side of the armature of the motor by wire 126. The other side of the armature is connected with a contact 129 by wire 130. When the lever 12 is in "forward" position contact 129 is engaged by the contact 31 which electrically connects contact 129 with a contact 132. Contact 132 is connected with a contact 133 by a wire 134 and contact 133 is connected with a field winding 135 of the motor 106 by wire 136. The other side of the motor windings 135 is connected by wires 139 to two resistance elements $R^3$ and $R^4$ connected in series, and which resistances are connected through wires 143, and 144 with motor field windings 146. The opposite side of the windings 146 are connected by wire 147 to the power line 149, which leads to the negative pole of the batteries.

The solenoid 117 is energized to close contacts 112 and 115 by the following circuit: power line 111, wire 152, solenoid 117, wire 153, switch 154 of a solenoid relay 155, wire 156, switch 157 of a solenoid relay 158, wires 159 and 160, contact 161 and, when the lever 11 of the motor control device 110 is in any of its speed control positions, contact 161 engages contact 162 which electrically connects contact 161 with contact 163. Contact 163 is connected with contact 164 by wire 165 and contact 164 is connected through line 166 to the negative power line 149. Thus, when the speed control lever 2 is moved from its neutral position to the first speed control position, the solenoid 117 is energized and the motor circuit previously described is established for causing the drive motor to operate at a relatively low speed.

It will be seen that the solenoid 117 will remain energized throughout the speed range of the control device 110 since the circuit for the solenoid is maintained through contacts 161 and 162, and, as is diagrammatically illustrated by the drawings, contact 162 is arranged to engage contact 161 throughout the four-speed positions of the contact lever 11.

The speed of the motor may be increased by shunting out of circuit the resistances $R^3$ and R⁴ by electrically interconnecting contacts 170 and 171 by contact 172, which occurs when the speed control lever is moved to the second speed position, and as indicated by the broken line B.

Still further speed may be had by shunting out of circuit motor windings 135 by electrically connecting contacts 133 and 170 through drum contact 169 and electrically connecting contact 171 with contact 164 by contact 173. This occurs when the speed control lever 11 is placed in the third speed position, and as indicated by the dotted line C.

Maximum speed of the motor is obtained by shunting of the motor windings 135 and 146 by electrically connecting contact 175 with contacts 164 and 171 through contact 173, which shunt circuit includes wire 176. It will be noted that the shape of contact 173 is such that it does not engage contact 175 until the speed control lever is moved to the fourth speed position, as indicated by the dotted line D. It will also be observed that the circuits for shunting out the resistances R³ and R⁴ and the motor windings 135 are maintained by the contacts 169 and 173.

When it is desired to apply the dynamic brake, the speed control lever 11 is moved to its neutral position, as is illustrated in Fig. 7, and the reverse lever 12 is moved to its opposite operative position, as for example, to the "reverse" position. When this occurs, the circuit of the solenoid 117 is broken between contacts 161 and 162, and upon the deenergization of the solenoid 117, contacts 112 and 115 open and contacts 114 and 116 close. The movement of the reverse lever 12 to the "reverse" position reverses the connections of the armature of the drive motor by connecting contact 123 with contact 180 and connecting contact 129 with contact 181. A circuit, including the armature of the drive motor is then effected through contacts 123 and 180 to contact 131 through connection 182, contacts 131 and 132, wire 134, contact 133, wire 136, motor windings 135, wires 139, 183, resistance BR, wire 184, contacts 114, 116, wire 120, contacts 121 and 122, connection 185 to contacts 181 and 129, wire 130 to the other armature and wire 126 to contact 123. Whenever solenoid 117 is deenergized a closed circuit similar to that described will be formed and the motor will act as a generator whenever the armature winding is reversed by operation of lever 12. Dynamic braking may be used when the truck is moving either forwardly or in reverse. Thus, the momentum of the truck driving the armature of the motor will cause the motor to generate current in the circuit outlined above and the resistance BR absorbs energy generated whereby considerable force of momentum of the truck is expended in driving the armature.

It is an object of my invention to prevent reenergization of the solenoid 117 so that it will be impossible for the truck operator to reestablish connection of the battery with the drive motor while current is being generated by the motor. The solenoid 186 of the solenoid relay 156 is connected across the resistance BR by wires 188 and 189. Preferably, the solenoid 186 is a relatively sensitive, low voltage type and when energized opens switch 157 and closes a switch 190. Switch 190 is located in the control circuit of a solenoid 191 of the relay 155, one side of the solenoid 191 being connected to the power line 111 by wire 192 and the opposite side of the solenoid being connected to one side of switch 190 through wire 193. The other side of switch 190 is connected to wires 196 and 160. It is apparent that when current is being generated by the motor and the speed control lever 11 is moved to any one of the speed control positions, solenoid 191 will be energized as wire 160 is connected to contact 161, which contact will then be electrically connected with contact 163 through contact 162; contact 163 is connected with contact 164 through connection 165, and contact 164 is connected with the power line 149 through wire 166. Since the circuit for solenoid 117 includes the switch 157, the solenoid 117 cannot be energized while the switch 157 is open, due to the energization of solenoid 186. When solenoid 191 is energized it closes switch 195 and opens switch 154 and thereby establishes a holding circuit around switch 190 through the switch 195 and wire 196.

In the event that the truck should be slowed down so that insufficient current is generated to maintain solenoid 186 energized and the speed lever 11 is in any of the speed control positions, switch 190 will be opened and contact 157 closed. Solenoid 117 cannot be energized, however, because switch 154 is maintained open by solenoid 191. Thus, the truck operator must return the speed control lever to its neutral position after the truck is stopped, or substantially stopped, before a circuit can be established for driving the truck in the opposite direction.

It will be apparent that by my invention it is impossible for the truck operator to inadvertently or through careless operation place excessive strain on the driving mechanism of the truck or to cause overloading of the electrical circuits for the motor by applying power to the truck motor for tending to drive the motor counter to the direction of movement of the truck.

Although I have shown two preferred forms of embodiments of the invention, it is to be understood that other forms may be adopted, all falling within the scope of the claims as follows.

I claim:

1. In a control system for an electric drive motor, a reversing device for changing the direction of rotation of the motor whereby the motor can be made to act as a generator for braking the motor; a speed control device for regulating the speed of the drive motor; means for interrupting the flow of current to the drive motor in response to current generated by the motor; and means controlled by said speed control device for continuing said interruption of current while the speed control device is in one or more speed control positions.

2. In a control system for an electric drive motor, a reversing device for changing the direction of rotation of the motor whereby the motor can be made to act as a generator for braking the motor; a speed control device for regulating the speed of the drive motor, said devices being interlocked whereby changing of the reversing device to reverse the motor is blocked when the speed control device is in a speed controlling position; means for interrupting the power circuit for the drive motor in response to current generated by the motor; and means for continuing interruption of said power circuit in the event the speed control device is in one or more speed control positions.

3. In a control system for an electric drive motor, a speed control device for regulating the speed of the motor; a device for reversing a circuit of the motor for causing the motor to act as a generator for braking the motor; a solenoid actuated switch for controlling the flow of current to the motor for energizing the motor; a circuit for the solenoid of said switch including, a first switch actuated by an electro-responsive device for causing opening of said solenoid switch in response to current generated by the motor and a second switch associated with the speed control device for causing opening of said solenoid switch when the speed control is in neutral position.

4. In a control system for an electric drive motor, a speed control device for regulating the speed of the motor; a device for reversing a circuit of the motor for causing the motor to act as a generator for braking the motor; a solenoid actuated switch for controlling the flow of current to the motor for energizing the motor; a circuit for the solenoid of said switch including, a first switch actuated by an electro-responsive device for causing opening of said solenoid switch in response to current generated by the motor, a second switch associated with the speed control device for causing opening of said solenoid switch when the speed control is in neutral position, and a third switch actuated by an electro-responsive device having a circuit including a switch controlled by the first mentioned electro-responsive device and said second switch for causing the solenoid switch to remain open while current is generated by the motor or while the speed control device is in speed controlling positions.

5. In a control system for an electric drive motor, a speed control device for regulating the speed of the motor; a device for reversing a circuit of the motor for causing the motor to act as a generator for braking the motor; a solenoid actuated switch for controlling the flow of current to the motor for energizing the motor; a circuit for the solenoid of said switch including, a first switch actuated by an electro-responsive device for causing opening of said solenoid switch in response to current generated by the motor, a second switch associated with the speed control device for causing opening of said solenoid switch when the speed control is in neutral position, and a third switch actuated by an electro-responsive device having a circuit including a switch controlled by the first mentioned electro-responsive device; a switch actuated by the second mentioned electro-responsive device for establishing a holding circuit for the second mentioned electro-responsive device around said switch in the circuit for the second mentioned electro-responsive device and said second switch for causing the solenoid switch to remain open while current is generated by the motor or while the speed control device is in speed controlling positions.

6. In a control system for an electric drive motor, a speed control device for regulating the speed of the motor; a device for reversing a circuit of the motor for causing the motor to act as a generator for braking the motor; an electric resistance element; a first switch for controlling the flow of current to the motor; a second switch for connecting said resistance element in said motor circuit for energizing said element by current generated by the motor; a solenoid for closing the first switch and opening the second switch when the solenoid is energized; a circuit for said solenoid including, third, fourth and fifth switches connected in series; a second solenoid for opening said third switch when said second solenoid is energized; a third solenoid for opening said fourth switch when said third solenoid is energized, said third solenoid being connected in said motor circuit energized by current generated by the motor, said fifth switch being operatively associated with the speed control device and being opened when the speed control device is in neutral position and closed when said speed control device is in speed control positions; and a holding circuit for said second solenoid, including, a switch actuated to closed position when said second solenoid is energized, the last mentioned switch being connected in series with said fifth switch for establishing a circuit from one side of said second solenoid through said fifth switch.

7. In a control system for an electric drive motor, means for causing said motor to act as a generator for braking the motor, said means including a circuit energized by the motor; means for controlling the supply of current to the motor, the last mentioned means including, a manually operative member; and means responsive to current generated in said circuit for latching said member in a position in which the supply of current to the motor is interrupted.

8. In a control system for an electric drive motor, means for causing said motor to act as a generator for braking the motor, said means including a circuit energized by the motor and a manually operable control member; means for controlling the supply of current to the motor, the last mentioned means including, a manually operative member; means for latching the first mentioned member in a position for rendering the first mentioned means ineffective when the second mentioned member is in a position for causing current to be applied to said motor; and means responsive to current generated in said circuit for latching said second mentioned member in a position in which the supply of current to the motor is interrupted.

CHARLES J. BURGY.